United States Patent [19]

Wachter et al.

[11] 4,010,375

[45] Mar. 1, 1977

[54] STORAGE RACK FOR NUCLEAR FUEL ASSEMBLIES

[76] Inventors: William J. Wachter, R.D. 4, English Road, Wexford, Pa. 15090; Thomas R. Robbins, 1528 Crofton Parkway, Crofton, Md. 21114

[22] Filed: May 27, 1975

[21] Appl. No.: 580,949

[52] U.S. Cl. ................................ 250/507; 250/518
[51] Int. Cl.² ............................................ G21F 5/00
[58] Field of Search .......... 250/506, 507, 515, 518; 176/30

[56]  References Cited

UNITED STATES PATENTS

| | | | |
|---|---|---|---|
| 3,667,540 | 6/1972 | Kupp | 250/507 X |
| 3,859,533 | 1/1975 | Suvanto | 250/507 |
| 3,882,313 | 5/1975 | Siemens, Jr. | 250/507 |

*Primary Examiner*—Davis L. Willis
*Attorney, Agent, or Firm*—Brown, Murray, Flick & Peckham

[57] ABSTRACT

A rack is provided for the storage of spent nuclear fuel assemblies in a water-filled storage pit. The rack consists of an array of storage cells containing the fuel assemblies and poison boxes consisting of water-filled enclosures having walls incorporating a neutron-absorbing material. The poison boxes function as neutron traps, and the storage cells and poison boxes are arranged in such a manner that each poison box is immediately adjacent at least one storage cell, and adjacent storage cells are in contact on at least one side of each cell. This results in maximizing the number of fuel assemblies that can be stored in a given space.

13 Claims, 5 Drawing Figures

STORAGE RACK FOR NUCLEAR FUEL ASSEMBLIES

BACKGROUND OF THE INVENTION

The present invention relates to storage facilities for spent nuclear fuel assemblies, and more particularly to a storage rack which maximizes the number of fuel assemblies that can be stored in a given space.

Nuclear reactors consist of an array of fuel rods containing the nuclear fuel. These fuel rods are metal tubes which may be from 8 to 15 feet in length and about ½ inch in diameter, and they are supported in groups in fuel assemblies which may typically consist of from 49 to as many as 300 individual fuel rods. The large reactors utilized for power generation contain a large number of these fuel assemblies arranged in a suitable configuration.

After an extended period of operation, which may be a year or more for example, the irradiated or spent fuel assemblies must be removed from the reactor and replaced. The spent fuel rods are then chemically reprocessed and renewed. The available chemical reprocessing facilities, however, are limited in capacity and the spent fuel assemblies must be stored at the nuclear reactor site until they can be shipped to a reprocessing facility. Storage of nuclear fuel assemblies presents serious problems since they are dangerously radioactive and must be kept submerged in water in a storage pit. Furthermore, since neutrons are still being emitted from the spent fuel assemblies, they must be stored in such a manner that criticality of the collection of fuel assemblies is prevented. This has heretofore required a very substantial spacing between fuel assemblies in the storage pit, so that they are separated by a considerable thickness of water which functions as a moderator and prevents criticality. In some cases, curtains of a poison, or neutron-absorbing material, have also been used between fuel assemblies but since such material does not capture fast neutrons, the necessity for a large spacing was not avoided. The result of this is that a very large space has been required for the storage of a substantial number of spent fuel assemblies, and many nuclear reactor plants do not have adequate storage facilities for the number of fuel assemblies which must be stored.

SUMMARY OF THE INVENTION

In accordance with the invention, a storage rack is provided for spent nuclear fuel assemblies which maximizes the number of assemblies that may be stored in a given area and at a reasonable cost.

The new storage rack is of modular construction, consisting of a plurality of storage cells or boxes containing the fuel assemblies and a plurality of poison boxes which function as neutron traps. The poison boxes are enclosures containing water, which functions as a moderator, and have walls which are made of a poison, or neutron-absorbing, material or which incorporate such material. The storage cells and poison boxes are disposed in an array such that each poison box is immediately adjacent at least one storage cell with their walls closely spaced. The fast neutrons emitted from the fuel assemblies in the storage cell thus pass through the adjacent poison box and are slowed down by the water therein so that they can be captured by the poison material of the opposite wall. In this way, the required spacing between fuel assemblies is greatly reduced and adjacent storage cells can be in contact on one or two sides of each cell. The number of fuel assemblies that can be stored in a given space is thus greatly increased. The modular construction results in a simple, relatively low-cost arrangement and the structure is such as to provide frictional damping between adjacent storage cells to absorb the energy of vibration due to earthquakes, thus providing a significant safety factor.

BRIEF DESCRIPTION OF THE DRAWINGS

The invention will be more fully understood from the following detailed description, taken in connection with the accompanying drawing, in which.

DESCRIPTION OF THE PREFERRED EMBODIMENT

Figure 1:
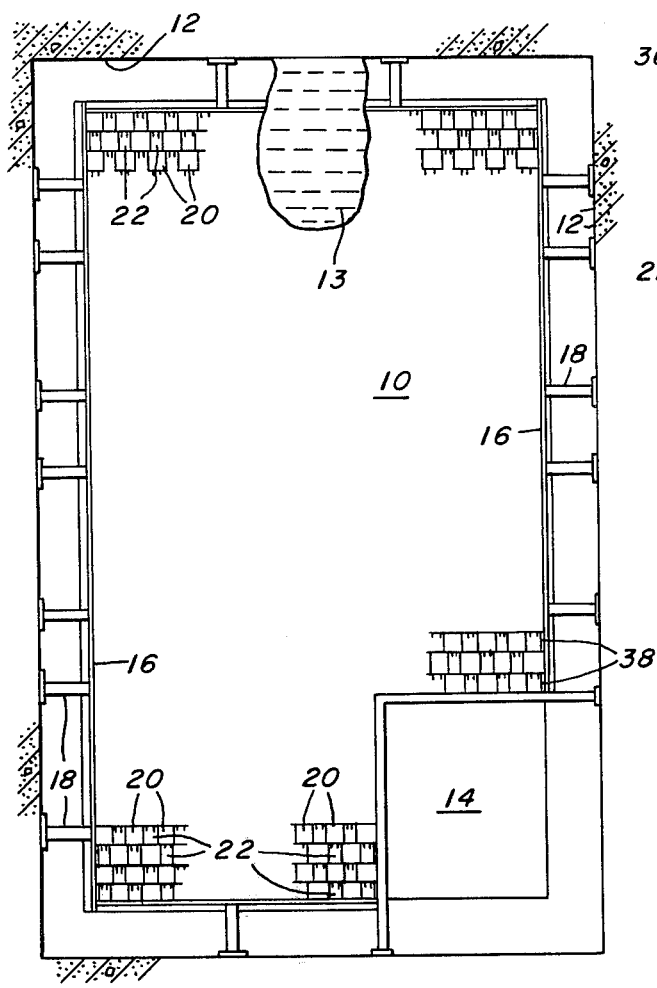
FIG. 1 is a plan view of a storage pit containing a storage rack embodying the invention.

There is shown in the drawing an illustrative embodiment of the invention in a storage rack for nuclear fuel assemblies disposed in a storage pit 10. Such storage pits are normally provided closely adjacent a nuclear reactor so that fuel assemblies can be moved between the reactor and the fuel handling and storage pit while submerged in water. The pit 10 may be of any usual or suitable construction and arrangement. Such pits are usually of the order of 40 feet deep with concrete walls 12, and are filled with water, as indicated at 13, to cover the fuel assemblies therein to a sufficient depth. A fuel assembly handling area 14 may be provided in a suitable location. Angle bars 16 may be supported on the pit walls 12 by suitable supports 18 and extend around the periphery of the pit to support the storage rack therein. Two rows of such bars 16, spaced apart vertically a suitable distance, may be provided if desired or necessary.

Figure 3:
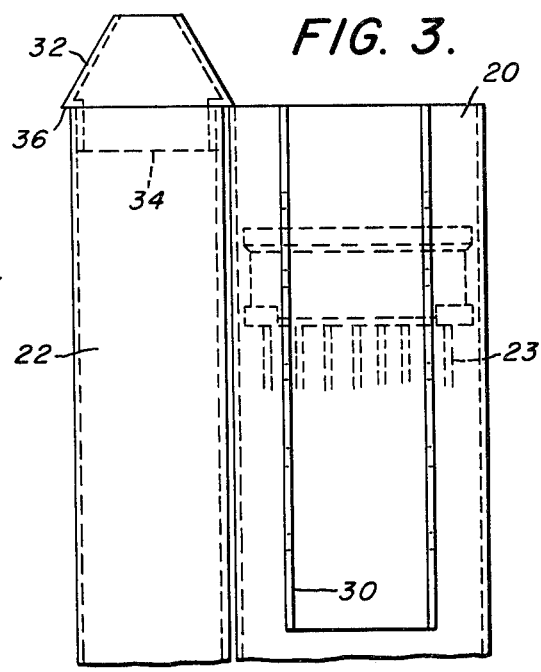
FIG. 3 is a side view showing a fuel storage cell and a poison box in assembled relation.
Figure 3:
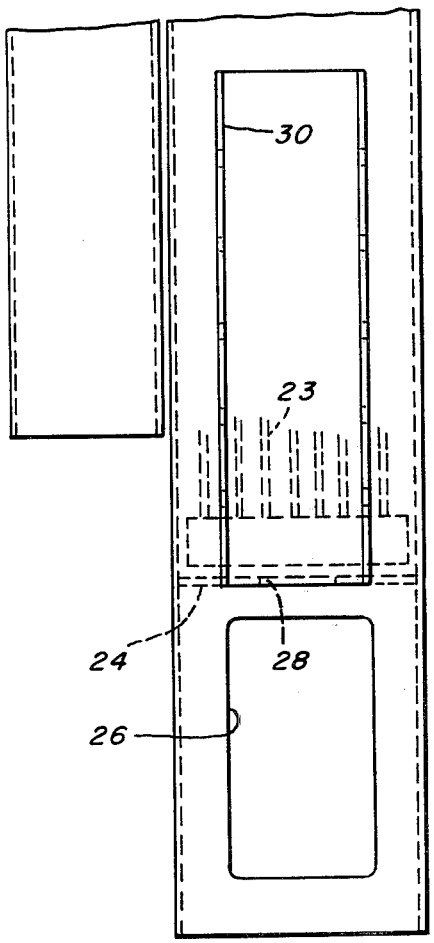
Figure 4:
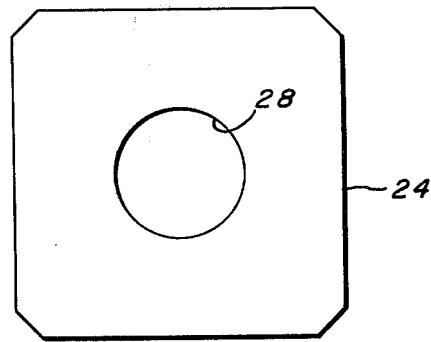
FIG. 4 is a plan view of a partition member.
Figure 2:
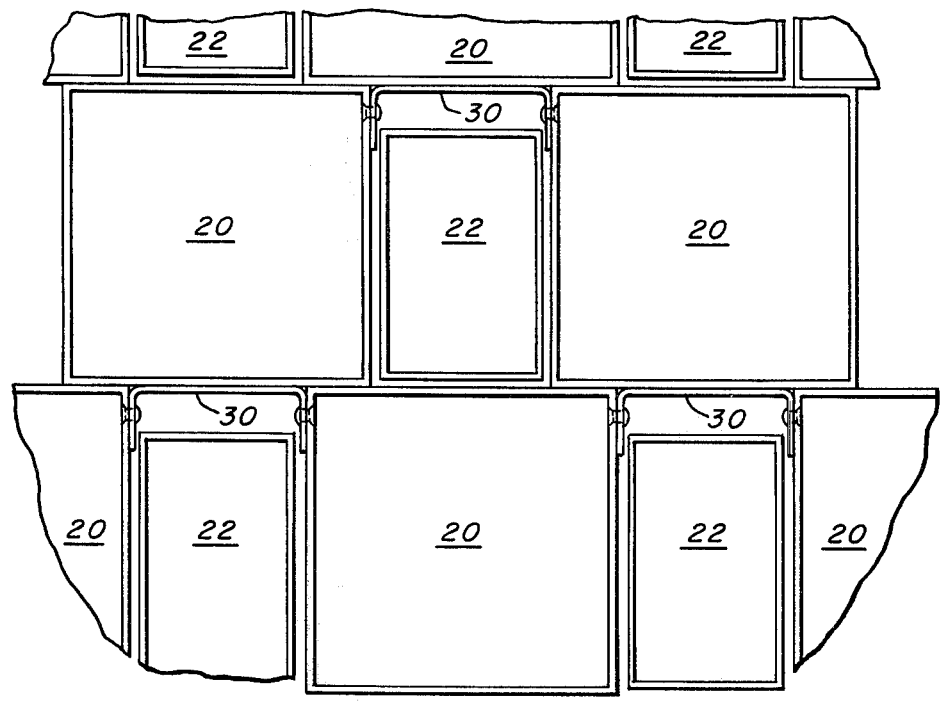
FIG. 2 is an enlarged fragmentary plan view showing a preferred arrangement of the storage rack.

As shown more particularly in FIGS. 2 and 3, the storage rack comprises a modular assembly made up of a plurality of fuel storage cells or boxes 20 and a plurality of poison boxes 22. The storage cells 20 are elongated, generally rectangular box-like members of the necessary size to contain one or more fuel assemblies 23, the number of fuel assemblies to be contained in each cell depending on the dimensions of the assemblies to be stored and their neutron multiplication characteristics. The storage cells 20 are open at the top and bottom, and each cell has a partition 24 secured in it near the bottom on which the fuel assembly or assemblies rest. Windows 26 are provided, preferably on all four sides of the cell 20 near the bottom, to permit free circulation of water into and through the cell through the windows 26 and a central opening 28 in the partition 24. The cells 20 may be made of any suitable material such as steel sheet. Channel members 30 are secured to one surface of the cell 20 by welding or in any other desired manner. The channels 30 may consist of two or more relatively short sections, as shown in FIG. 3, or a single long channel might be utilized if desired.

The poison boxes 22 serve as neutron traps. Each of the boxes 22 is a rectangular, enlongated enclosure, as shown in the drawing, open at the top and bottom to permit circulation of water through the box and preferably somewhat shorter than the storage cells 20, as can be seen in FIG. 3. The poison boxes 22 are intended to be filled with water, which functions as a moderator to slow down neutrons passing through it, and the walls of the boxes capture or absorb neutrons passing through them. Any suitable poison material may be used for this purpose. Several poison, or neutron-absorbing, materials are known including boron, aluminum-boron, cadmium and gadolinium. In the preferred embodiment, the walls of the poison box themselves are made of the poison material, and cadmium in thin sheet form (0.040 inch thick) is preferably used to make the boxes. Any other suitable material having the necessary characteristics could, of course, be used, and the poison material could be merely coated on the walls of the poison boxes or incorporated in the walls in any other desired manner. Each poison box 22 is provided with a cap 32 which may be made of sheet metal or of any desired material. The cap 32 has sloping walls and is open at the top to permit circulation of water. A downward extension 34 extends into the top of the poison box and engages tightly therein so as to be retained in position by the frictional engagement. The cap 32 extends laterally beyond the walls of the extension 34 to provide an overhanging ledge 36 extending around the poison box.

The storage cells 20 and poison boxes 22 can be disposed in a modular array in the pit 10 in any suitable arrangement, the arrangement being such that each storage cell is immediately adjacent at least one poison box. In the preferred arrangement shown in FIGS. 1 and 2 of the drawing, the dimensions of the poison boxes are made less than the dimensions of the storage cells 20 in both directions, and the width of the poison boxes is made such that they will fit into the channel members 30, as can be seen in FIG. 2. The modular array is then made up as shown with storage cells and poison boxes alternating with each other in both directions to form a checkerboard configuration.

In assembling such an array, the storage cells are placed in position and joined together by riveting or bolting each cell to the flanges of the channels 30 of the adjacent cells on each side, thus providing spaces between the cells in each row of width determined by the channels 30. The poison boxes 22 are placed in these spaces and are suspended by engagement of the ledges 36 with the adjacent edges of the storage cells on each side. It will be noted that with this arrangement adjacent rows of storage cells are not spaced apart and each storage cell is in contact with adjacent cells on two opposite sides. This arrangement can be extended to fill the entire pit 10, as shown in FIG. 1, or to provide as many storage cells as may be required. The entire rack structure is disposed in the pit 10 so as to be immersed in water, with the storage cells 20 and the poison boxes 22 completely filled with water. In order to fit properly in the pit, the channels 30 may be omitted from the last row of storage cells which abut the angle members 16, and the angle members 16 on the sides of the pit may carry spacers 38 in position to engage the adjacent poison boxes to properly support the assembly. The fuel assemblies 23 to be stored may be lowered into place in the cells 20 after the assembly is completed, and the sloping sides of the caps 32 on all four sides of each cell guide the fuel assemblies into the cells.

When the pit 10 is filled with water, substantially all of the water external to the storage cells is enclosed by the poison boxes 22, so that the utilization of both poison material and moderator is optimized. The poison boxes serve as traps for fast neutrons and effectively reduce the neutron population in the region. This trap effect is a result of having a region of water completely surrounded by the poison material. The poison is only effective in absorbing slow neutrons, so that the side of the poison box immediately adjacent a storage cell absorbs only slow neutrons while fast neutrons generated by the nuclear fuel pass through the poison wall. These fast neutrons, however, are slowed down by the water contained in the poison box and are sufficiently slowed to be captured by the opposite wall of the poison box. In this way, the boxes 22 serve as neutron traps, and the spacing required between storage cells to avoid any risk of criticality is very much reduced as compared to the spacing that would otherwise be required. In conventional practice, a spacing of at least 21 inches on all sides between adjacent fuel assemblies has been considered necessary to avoid criticality. With the use of the poison boxes of the present invention, however, this spacing is very greatly reduced and can actually be reduced to zero on one or even two sides of the storage cells. Flexibility in design is also achieved since the necessary width of the poison boxes can be adjusted as necessary, depending on the neutron multiplication characteristics, so as to provide the required degree of subcriticality.

The modular arrangement of the storage rack provides a simple structural design of high strength and low weight which can readily be controlled dimensionally and easily assembled since the storage cells are simply bolted or riveted together and the poison boxes are suspended from the top edges of the cells. Thus, a simpler and less expensive structure is provided than the conventional welded framework of structural steel. This structure also has a further advantage since the engaging surfaces of the storage cells and of the storage cells and channels are in frictional engagement with some capability of relative movement. This provides a mechanical friction damping capable of absorbing the vibration energy of earthquake shocks, or other severe mechanical shocks, thus providing an additional safety factor not obtainable in other arrangements.

Figure 5:
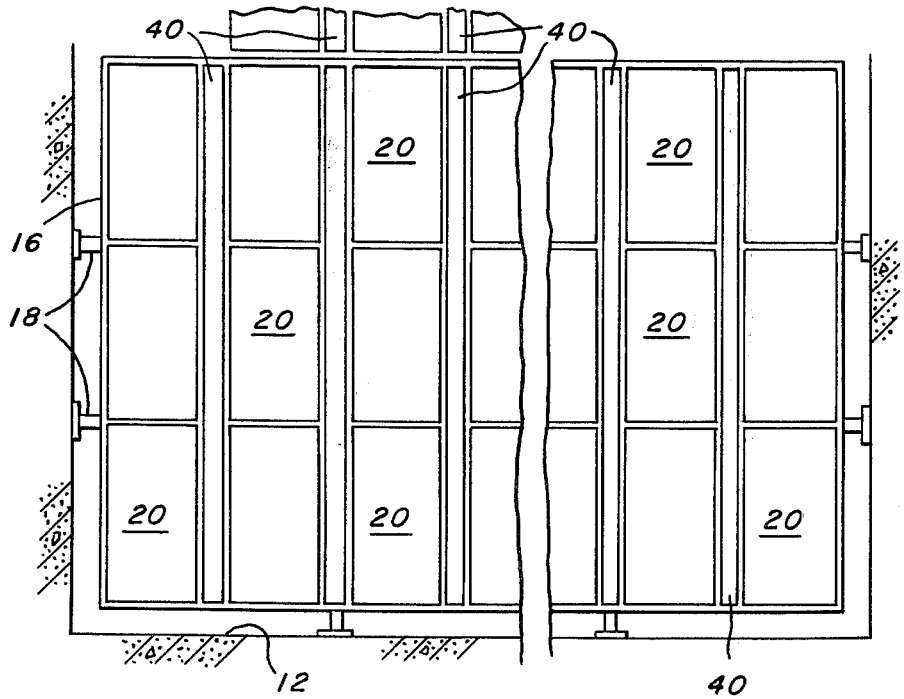
FIG. 5 is a somewhat diagrammatic plan view of a storage rack showing an alternative arrangement.

As previously indicated, various arrangements of the modular array of storage cells and poison boxes are possible. FIG. 5 shows, by way of example, another possible arrangement of a fuel rack embodying the invention. In this instance, the poison boxes 40 are made of greater length than in the previous embodiment and each poison box is shown as extending over three of the storage cells 20 which may be generally similar to those previously described except that no channels 30 are used, the cells being directly attached to adjacent cells. Except for the dimensions, the poison boxes 40 may be similar to the boxes 22, having walls incorporating the poison material and enclosing the water which serves as moderator. The length of the poison boxes 40 depends, of course, on the characteristics of the fuel assemblies contained in the storage cells 20, and they may be of greater or lesser extent than that shown in FIG. 5. In this arrangement, since each poison box extends over two or more storage cells, the storage cells and poison boxes alternate with each other in only one direction of the assembly, resulting in the arrangement shown in FIG. 5. It will be seen that each storage cell is still immediately adjacent at least one poison box or, conversely, that each poison box is immediately adjacent at least one storage cell, and that two opposite sides of each storage cell are essentially in contact with adjacent cells. The effectiveness of this arrangement is obviously the same as that previously described and it will be apparent that other arrangements of the storage cells and poison boxes might be made within the scope of the invention.

It will now be apparent that a storage rack has been provided for storing spent nuclear fuel assemblies which maximizes the number of fuel assemblies that can be stored in a given space by very greatly reducing the spacing necessary between assemblies, with a maximum ratio of stored fuel to poison. Since the spacing between storage cells is reduced to zero on at least one side of each cell, and preferably on two sides, a much tighter array, with greater storage capacity, is obtained than has been possible with previous rack designs. The bolted or riveted modular construction results in a simpler and less expensive structure than the welded assemblies which have been used heretofore, and the modular construction makes it possible to expand the rack as needed. The construction shown introduces friction damping between the elements of the array to increase the safety by absorbing and dissipating the energy of earthquakes or other severe mechanical shocks.

We claim as our invention:

1. A storage rack for nuclear fuel assemblies comprising a plurality of storage cells each arranged to contain at least one fuel assembly, and a plurality of poison boxes, each of said poison boxes comprising an enclosure containing a moderator and having walls incorporating a neutron-absorbing material, said storage cells and poison boxes being disposed in an array such that each cell is immediately adjacent at least one poison box.

2. A storage rack as defined in claim 1 in which each storage cell is in contact with an adjacent storage cell on at least one side.

3. A storage rack as defined in claim 1 in which said storage cells and poison boxes are filled with water.

4. A storage rack as defined in claim 1 in which said storage cells and poison boxes are immersed in a water-filled pit and have openings to permit free circulation of water therethrough.

5. A storage rack as defined in claim 4 in which the poison boxes are disposed between adjacent storage cells and adjacent storage cells are in frictional contact on at least one side of each cell.

6. A storage rack as defined in claim 1 in which said neutron-absorbing material is selected from the group consisting of boron, aluminum-boron, cadmium and gadolinium.

7. A storage rack as defined in claim 1 in which the walls of said poison boxes are made of cadmium in thin sheet form.

8. A storage rack for nuclear fuel assemblies for immersion in a water-filled pit, said storage rack comprising a plurality of storage cells and a plurality of poison boxes, said storage cells being elongated, generally rectangular cells arranged to contain at least one fuel assembly, said poison boxes being elongated, generally rectangular enclosures having walls incorporating neutron-absorbing material, said storage cells and poison boxes being disposed in an array such that each poison box is immediately adjacent at least one storage cell and adjacent storage cells are in contact on at least one side of each cell.

9. A storage rack as defined in claim 8 in which the storage cells and poison boxes are open at the top and bottom to permit free circulation of water therethrough.

10. A storage rack as defined in claim 8 in which the poison boxes are supported on the storage cells and adjacent storage cells are in frictional contact with each other on at least one side.

11. A storage rack as defined in claim 8 in which the storage cells and poison boxes alternate with each other in at least one direction throughout the array.

12. A storage rack as defined in claim 8 in which the storage cells and poison boxes alternate with each other in both directions throughout the array to form a checkerboard configuration.

13. A storage rack as defined in claim 8 in which each poison box extends over a plurality of storage cells, and the storage cells and poison boxes alternate with each other in one direction throughout the array.

* * * * *